United States Patent [19]

Nishioka et al.

[11] Patent Number: 4,524,370
[45] Date of Patent: Jun. 18, 1985

[54] ELECTROSTATIC RECORDING APPARATUS

[75] Inventors: Nobuaki Nishioka, Toyokawa; Tatsumi Makio; Katsutsune Ito, both of Toyohashi, all of Japan

[73] Assignee: Minolta Camera Kabushiki Kaisha, Osaka, Japan

[21] Appl. No.: 448,506

[22] Filed: Dec. 9, 1982

[30] Foreign Application Priority Data

Dec. 21, 1981 [JP] Japan ................................ 56-206579

[51] Int. Cl.³ ............................................ G01D 15/06
[52] U.S. Cl. ..................................................... 346/155
[58] Field of Search ......................... 346/139 C, 155; 358/300

[56] References Cited

FOREIGN PATENT DOCUMENTS 54-4128   1/1979  Japan .
54-34831  3/1979  Japan .

Primary Examiner—Thomas H. Tarcza
Attorney, Agent, or Firm—Wenderoth, Lind & Ponack

[57] ABSTRACT

An electrostatic recording apparatus including a plurality of recording electrodes arranged at right angles to a transport direction of an electrostatic recording paper, a plurality of first recording electrodes disposed at the upstream side of the recording electrodes and each having a first face confronting the electrostatic recording paper, and a plurality of second recording electrodes disposed at the downstream side of the recording electrodes and each having a second face confronting the electrostatic recording paper. In the apparatus, the width of the first face, measured in the transport direction of the electrostatic recording paper, is smaller than that of the second face.

5 Claims, 11 Drawing Figures

ELECTROSTATIC RECORDING APPARATUS

BACKGROUND OF THE INVENTION

The present invention generally relates to an electrostatic recording apparatus and more particularly, to an electrostatic recording apparatus employing a single-faced and double-sided control type (also referred to as "a side face control type") recording head.

Figure 1:
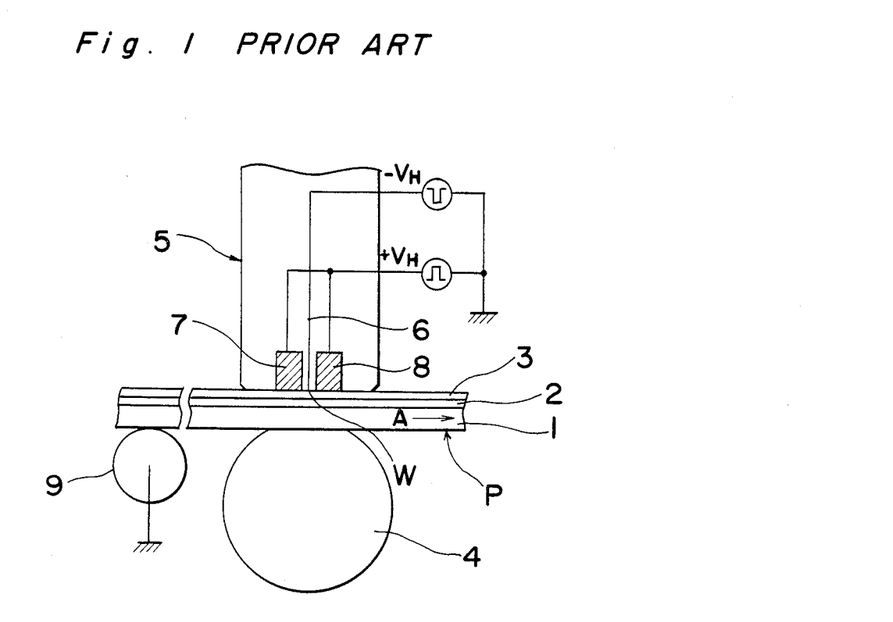
FIG. 1 is a longitudinal sectional view of a conventional electrostatic recording apparatus (already referred to)
Figure 2:
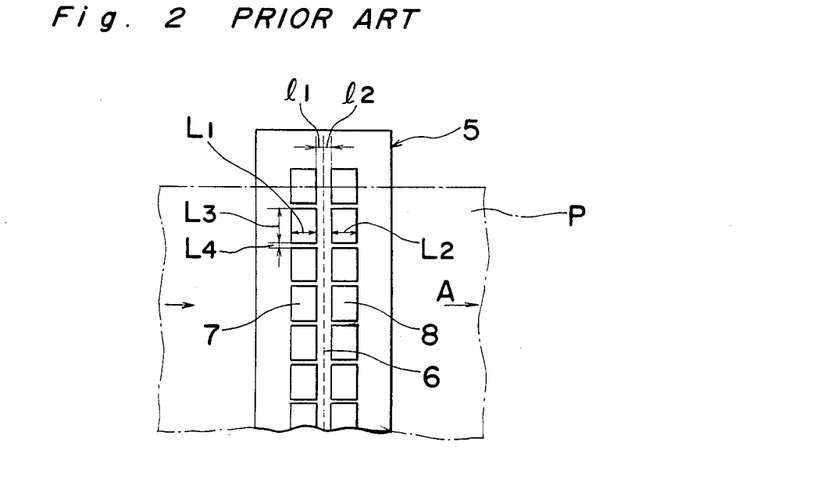
FIG. 2 is a bottom plan view of a stylus head employed in the electrostatic recording apparatus of FIG. 1 (already referred to)

Conventionally, in electrostatic recording apparatuses of the above described type, it has been so arranged as shown in FIGS. 1 and 2 that a single-faced and double-sided control type recording head (hereinbelow, referred to as "a stylus head") 5 is provided so as to confront an electrically insulative elastic roller 4 such that an electrostatic recording paper P including a base sheet 1, a conductive layer 2 provided on the base sheet 1, and a dielectric layer 3 provided on the conductive layer 2 can be interposed between the stylus head 5 and the elastic roller 4 with the dielectric layer 3 facing the stylus head 5. The stylus head 5 includes a plurality of needle-like recording electrodes 6 and a plurality of controlling electrodes 7 and 8. The recording electrodes 6 are arranged at right angles to the transport direction of the electrostatic recording paper P. It is to be noted that the electrostatic recording paper P is transported in the direction of the arrow A in FIGS. 1 and 2. The controlling electrodes 7 are disposed in parallel with the recording electrodes 6 and at the upstream side of the recording electrodes 6 with respect to the transport direction of the electrostatic recording paper P while the controlling electrodes 8 are disposed in parallel with the recording electrodes 6 and at the downstream side of the controlling electrodes 6 with respect to the transport direction of the electrostatic recording paper P. Furthermore, a grounding roll 9 for removing unnecessary electric charges from the electrostatic recording paper P is provided at the upstream side of the controlling electrodes 7.

In order to simplify the drive circuit of the stylus head 5, it has been so arranged that the recording electrodes 6 are divided into groups each containing a predetermined number of the recording electrodes 6, and a voltage of $-VH$ (or $+VH$) is applied to each group of the recording electrodes 6. After a width L3 of each of the controlling electrodes 7 and 8, measured at right angles to the transport direction of the electrostatic recording paper P is set at a value so as to contain a proper number of the recording electrodes 6 therein, a voltage of $+VH$ (or $-VH$) is applied to the controlling electrodes 7 and 8 such that a matrix circuit is formed. In the matrix circuit, it is so arranged that in the case where both the recording electrodes 6 and the controlling electrodes 7 and 8 are set to the ON state for recording on portions of the electrostatic recording paper P at a recording position W of the stylus head 5, a sufficient amount of electric charge enabling adherence of toner to the electrostatic recording paper P is accumulated on the recording portions of the electrostatic recording paper P. Furthermore, in the matrix circuit, it is so arranged that a sufficient amount of electric charge enabling adherence of toner to the electrostatic recording paper P is not accumulated on the electrostatic recording paper P in the case where only one or the other of the recording electrodes 6 and the controlling electrodes 7 and 8 is set to the ON state. The width L3 of each of the controlling electrodes 7 and 8, measured at right angles to the transport direction of the electrostatic recording paper P, is set, for example, at 3.5 mm approximately in the case where 32 controlling electrodes 6 are contained in the width L3 in a stylus head having a resolving power of 8 lines per mm. Meanwhile, the clearance L4 between adjoining controlling electrodes 7 and also between adjoining controlling electrodes 8 is set at 0.5 mm approximately. It should be noted that the length L1 of each of the controlling electrodes 7 and the length L2 of each of the controlling electrodes 8, each measured in the transport direction of the electrostatic recording paper P, are equal to each other and are set at 4 to 6 mm. Meanwhile, the distance l1 between the controlling electrodes 7 and the recording electrodes 6 and the distance l2 between the recording the electrodes 6 and the controlling electrodes 8, each measured in the transport direction of the electrostatic recording paper P is set at 0.5 mm approximately.

In order to raise the recording density of an image formed by the stylus head 5 of the above described type, voltages applied to the recording electrodes 6 and the controlling electrodes 7 and 8 are required to be increased since the time period for applying the voltages to the recording electrodes 6 and the controlling electrodes 7 and 8 cannot be lengthened very much in connection with a high recording speed of the stylus head 5. Thus, increase of the voltages applied to the recording electrodes 6 and the controlling electrodes 7 and 8 promotes accumulation of electric charge on portions of the electrostatic recording paper P, which portions are not recorded on, so that toner is caused to adhere, through development, to the portions on which no recording is desired and thus, so-called ghost images are formed, thereby resulting in deterioration the image quality of the electrostatic recording.

Hereinbelow, the mechanism of formation of ghost images will be described in detail.

Each time the controlling electrodes 7 are scanned, the voltage of $+VH$ is applied to portions of the electrostatic recording paper P, with the portions being disposed immediately below the controlling electrodes 7 and thus, negative electric charge is accumulated on the portions. Although the negative electric charge accumulated on the portions is discharged therefrom when the controlling electrodes 7 reach a zero potential in the case where the dielectric layer 3 of the electrostatic recording paper P is in contact with the controlling electrodes 7, the negative electric charge is not readily discharged from the portions since a clearance of 5 to 10 $\mu$m is actually formed between the dielectric layer 3 and the controlling electrodes 7. Although the grounding roll 9 provided at the upstream side of the recording position W is also adapted to discharge the accumulated negative electric charge, the grounding roll 9 loses its effect in the case where the resistance of the base sheet 1 is subjected to change due to ambient conditions such as temperature, humidity, etc. Thus, it may be understood that the negative electric charge is left on a part of the electrostatic recording paper P, to which part no voltage is applied from the recording electrodes 6, thereby resulting in formation of the ghost images in some kinds of toner. Furthermore, it is supposed that the controlling electrodes 7 each having the width L1 as large as 4 to 6 mm are likely to produce the ghost images.

More specifically, the mechanism of formation of the ghost images will be described with reference to FIGS. 3 and 4, hereinbelow.

Figure 3:
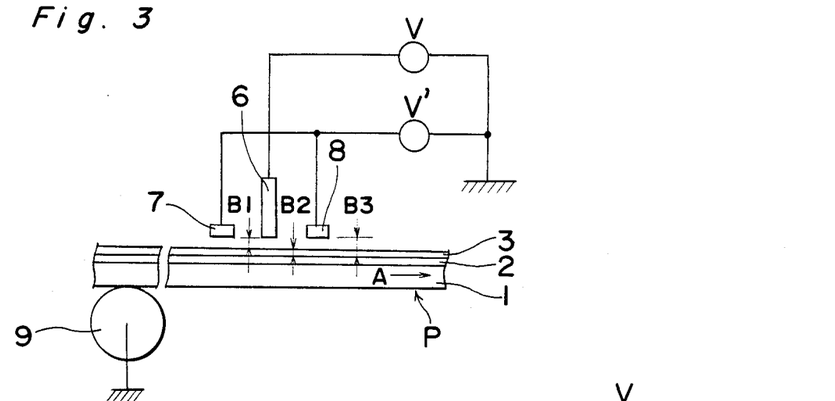
FIG. 3 is a schematic illustration explanatory of a principle of the electrostatic recording apparatus of FIG. 1 (already referred to)
Figure 4:
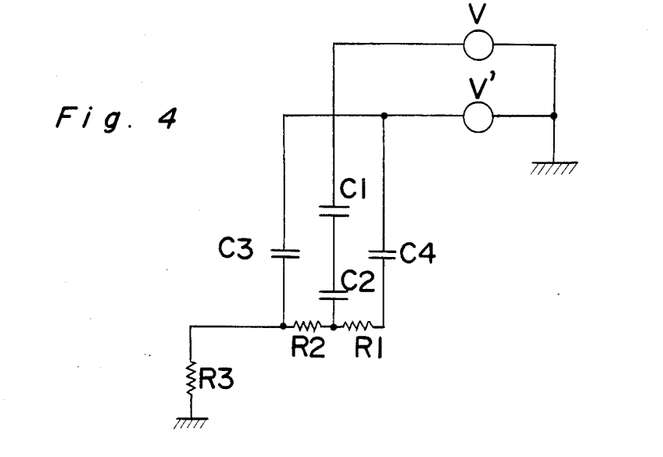
FIG. 4 is an equivalent circuit diagram of the electrostatic recording apparatus of FIG. 3 (already referred to)

It is to be noted here that FIG. 3 schematically illustrates a principle of the conventional electrostatic recording apparatus of FIG. 1, and FIG. 4 shows an equivalent circuit thereof. In FIG. 3, the recording electrodes 6 and the controlling electrodes 7 and 8 are spaced away from the dielectric layer 3. Thus, electrostatic capacities B1 and B3 are, respectively, produced between the recording electrodes 6 and the dielectric layer 3 and between the conductive layer 2 and each of the controlling electrodes 7 and 8 with the dielectric layer 3 having an electrostatic capacity B2. As shown in FIG. 4, the electrostatic recording paper P constitutes a resistor R1 between the controlling electrodes 8 and the recording electrodes 6, a resistor R2 between the recording electrodes 6 and the controlling electrodes 7 and a resistor R3 between the controlling electrodes 7 and the grounding roll 9. Capacitors C1 and C2 have the electrostatic capacities B1 and B2, respectively while each of the capacitors C3 and C4 has the electrostatic capacity B3. It is to be noted that a charging point is disposed between the capacitor C1 and the capacitor C2. A power source V′ having the voltage of $+VH$ is connected to ground on one hand and is, on the other hand, connected to the capacitor C3 leading to the resistor R3 connected to ground. The power source V′ is also connected to the capacitor C4 and the capacitor C4 is, in turn, connected, through the resistor R1, to the resistor R2 leading to the resistor R3. A power source V having the voltage of $-VH$ is connected to ground on one hand and is, on the other hand, connected, via the capacitor C1, to the capacitor C2 leading to the junction of the resistor R1 and the resistor R2. Thus the amount of electricity charged on the dielectric layer 3 varies with the electrostatic capacity B3 in the case where the electrostatic capacities B1 and B2 are constant due to capacitive coupling therebetween. Meanwhile, the electrostatic capacity B3 is proportional to the area of the face of each of the controlling electrodes 7 and 8, which face confronts the electrostatic recording paper P. Since it is so arranged that upon transport of the electrostatic recording paper P, the recording voltage of a polarity opposite to that of the voltage applied to the controlling electrodes 7 is applied, a matrix drive, to the recording portions of the electrostatic recording paper P by the recording electrodes 6, on which recording portions electric charge has been accumulated by the controlling electrodes 7 disposed at the upstream side of the recording electrodes 6, it is supposed that slight electric discharge takes place at portions of the electrostatic recording paper P, other than the recording portions, thereby resulting in formation of the ghost images. Accordingly, it can be concluded that the area of the face of each of the controlling electrodes 7 disposed at the upstream side of the recording electrodes 6 should be restricted to a minimum so as to decrease the electrostatic capacity B3 of the capacitor C3 such that accumulation of electric charge on the electrostatic recording paper P at the upstream side of the recording electrodes 6 is minimized at the face confronting the electrostatic recording paper P.

Conventionally, a number of countermeasures have been taken against formation of the ghost images, etc.

For example, Japanese Laid Open Patent Application No. 4128/1979 (Tokkaisho 54-4128) has proposed a method for preventing formation of the ghost images, in which clamping electrodes are provided on a part of the elastic roller 4 such that electric charge accumulated on the electrostatic recording paper P, except for electric charge accumulated on the recording portions thereof, is discharged to ground through the clamping electrodes. However, this method has such inconveniences that the mechanism and control circuit become complicated, the apparatus becomes large in size and the production cost of the apparatus is raised.

Japanese Laid Open Patent Application No. 1626/1979 (Tokkaisho 54-1626) has disclosed a method for preventing formation of the ghost images, in which a clamping electrode for grounding is provided adjacent to the controlling electrodes 7 disposed at the upstream side of the recording electrodes 6 with respect to the transport direction of the electrostatic recording paper P such that electric charge accumulated on the electrostatic recording paper P, except for electric charge accumulated on the recording portions thereof, is discharged to ground through the clamping electrode in the same manner as the above described method. However, this method has such a disadvantage that formation of images becomes unstable depending on the mounting accuracy of the clamping electrode. Furthermore, in this method, since in the same manner as the above described method, the clamping electrode for grounding is disposed adjacent to the recording electrodes 6 and the controlling electrodes 7 and 8 to which high voltages are applied, the apparatus presents a great danger to an operator thereof, so that it becomes necessary to provide a mechanism for preventing the recording electrodes 6 and the controlling electrodes 7 and 8 from being set to the ON state in the case of absence of the electrostatic recording paper P.

Furthermore, Japanese Laid Open Patent Application No. 34831/1979 (Tokkaisho 54-34831) has proposed a method for forming recording images of high density at a low recording voltage and for preventing formation of the ghost images, in which the voltage applied to the controlling electrodes 8 disposed at the downstream side of the recording electrodes 6 with respect to the transport direction of the electrostatic recording paper P is made lower than the voltage applied to the controlling electrodes 7 disposed at the upstream side of the recording electrodes 6 with respect to the transport direction of the electrostatic recording paper P such that electric charge is prevented from disappearing from the electrostatic recording paper P through neutralization of the surface potential of the electrostatic recording paper P at the time when the recording face of the electrostatic recording paper P is transported immediately below the controlling electrodes 8 disposed at the downstream side of the recording electrodes 6. However, this method involves such problems that the power source circuit and control circuit become complicated and the electrostatic recording apparatus becomes large in size and high in production cost.

Moreover, there have been proposed various methods in which timing of application of voltages to the controlling electrodes 7 and 8 is controlled in a sophisticated manner, the controlling electrodes 7 and 8 are formed into complicated shapes, an electrostatic recording paper adapted to make it difficult to form the ghost images thereon is utilized, etc. However, these known methods have been disadvantageous in that the electrostatic recording apparatus becomes large in size and high in production cost, the electrostatic recording paper becomes expensive, etc.

Figure 5:
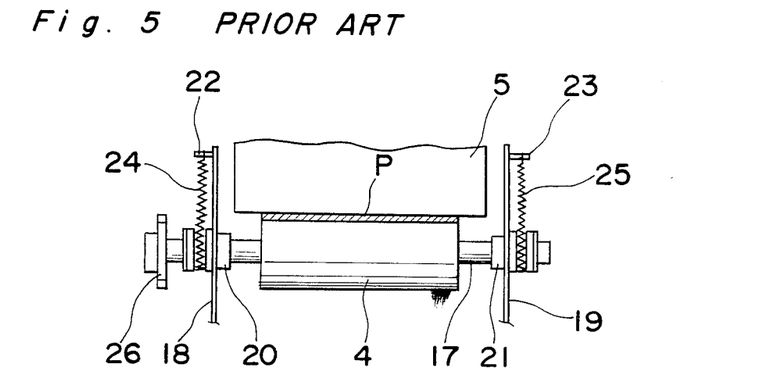
FIG. 5 is a transverse sectional view of the electrostatic recording apparatus of FIG. 1 (already referred to)

Meanwhile, conventionally, in electrostatic recording apparatuses, it has been so arranged as shown in FIG. 5 that the elastic roller 4 is brought into pressure contact with the recording electrodes 6 and the controlling electrodes 7 and 8. Namely, a rotary shaft 17 for the elastic roller 4 is supported by a bearing 20 provided on a frame 18 and a bearing 21 provided on a frame 19. Furthermore, pins 22 and 23 are secured to the frames 18 and 19, respectively and a tension spring 24 having one end attached to the pin 22 and a tension spring 25 having one end attached to the pin 23 are wound around the bearings 20 and 21, respectively. Thus, the elastic roller 4 is brought into pressure contact with the stylus head 5 such that the urging force of the tension springs 24 and 25 is balanced with a reactive elastic force of the elastic roller 4 and the electrostatic recording paper P is transported through a driving force from a gear 26 mounted on one end of the rotary shaft 17 adjacent to the bearing 20. However, the prior art electrostatic recording apparatuses are readily subjected to such inconveniences that an image has an unformed part, ghost images are formed and the background of the image becomes stained since the elastic roller 4 is not brought into pressure contact with the stylus head 5 uniformly, namely the elastic roller 4 is not positioned accurately with respect to the stylus head 5.

SUMMARY OF THE INVENTION

Accordingly, an essential object of the present invention is to provide an improved electrostatic recording apparatus in which images of high quality are obtained through minimized image defects and prevention of formation of ghost images.

Another important object of the present invention is to provide an improved electrostatic recording apparatus of the above described type having a stylus head which is simple in structure and control.

Still another object of the present invention is to provide an improved electrostatic recording apparatus of the above described type in which an elastic roller is positioned accurately with respect to the stylus head such that excellent images are formed by preventing formation of an image having an unformed part, formation of ghost images, fogging of the background of the images, etc.

A still further object of the present invention is to provide an improved electrostatic recording apparatus of the above described type which is simple in structure, highly reliable in actual use and suitable for mass production at low cost.

In accomplishing these and other objects according to one preferred embodiment of the present invention, there is provided an improved electrostatic recording apparatus including a recording head comprising a plurality of recording electrodes arranged at right angles to the transport direction of an electrostatic recording paper, a plurality of first controlling electrodes disposed in parallel with said recording electrodes and at the upstream side of said recording electrodes with respect to the transport direction of the electrostatic recording paper, and a plurality of second controlling electrodes disposed in parallel with said recording electrodes and at the downstream side of said recording electrodes with respect to the transport direction of the electrostatic recording paper such that an electrostatic image is formed on the electrostatic recording paper at the recording position of said recording head, said first controlling electrodes each being formed with a first face confronting the electrostatic recording paper with said first face having a first width in the transport direction of the electrostatic recording paper, said second controlling electrodes each being formed with a second face confronting the electrostatic recording paper with said second face having a second width in the transport direction of the electrostatic recording paper, and said first width of said first face being made smaller than said second width of said second face.

In accordance with the present invention, images of high quality with minimized image defects are obtained by preventing formation of the ghost images.

Furthermore, in accordance with the present invention, since the elastic roller is positioned accurately with respect to the stylus head, images of excellent quality are formed by preventing formation of an image having an unformed portion, formation of the ghost images, fogging of the background of the images, etc.

BRIEF DESCRIPTION OF THE DRAWINGS

These and other objects and features of the present invention will become apparent from the following description of the preferred embodiment thereof with reference to the accompanying drawings, in which.

Before the description of the present invention proceeds, it is to be noted that like parts are designated by like reference numerals the several views of the accompanying drawings.

DETAILED DESCRIPTION OF THE INVENTION

Figure 6:
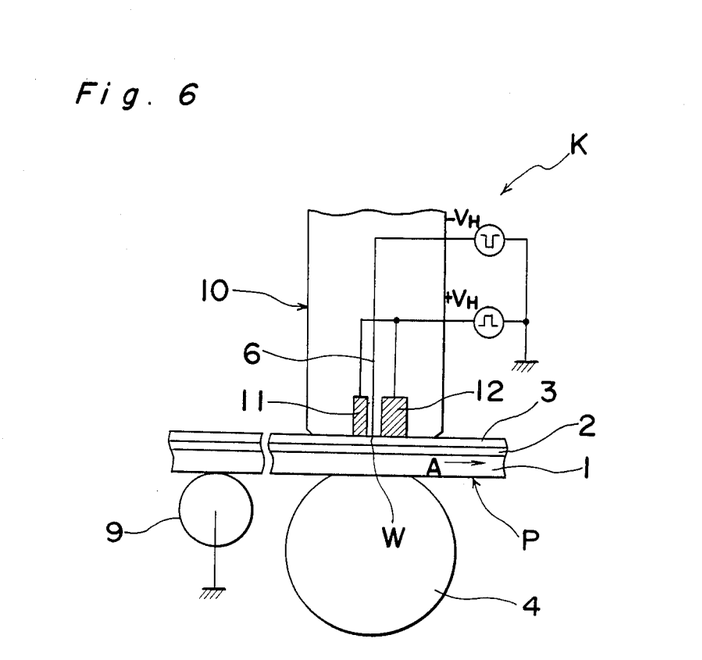
FIG. 6 is a longitudinal sectional view of an electrostatic recording apparatus according to a first embodiment of the present invention.
Figure 7:
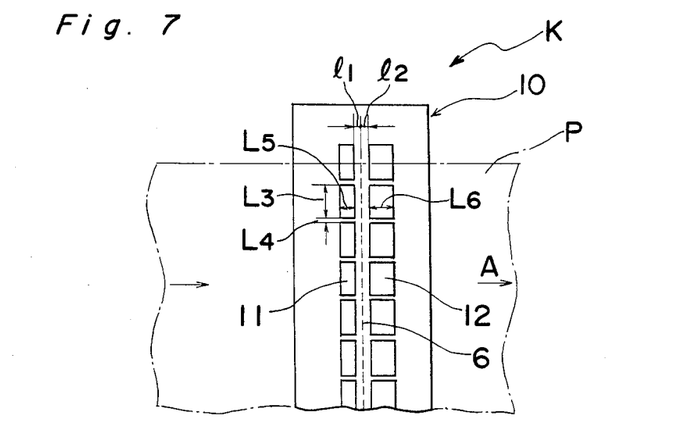
FIG. 7 is a bottom plan view of a stylus head employed in the electrostatic recording apparatus of FIG. 6.

Referring now to the drawings, there is shown in FIGS. 6 and 7, an electrostatic recording apparatus K according to a first embodiment of the present invention.

In the electrostatic recording apparatus K, a stylus head 10 is provided so as to confront the elastic roller 4 such that the electrostatic recording paper P can be interposed between the stylus head 10 and the elastic roller 4 and a plurality of controlling electrodes 11 and 12 are, respectively, arranged at the upstream side and the downstream side of a series of the recording electrodes 6 in parallel therewith in the same manner as the conventional electrostatic recording apparatus shown in FIGS. 1 and 2. However, although in the conventional electrostatic recording apparatus, it is so arranged that the length L1 of each of the controlling electrodes 7 disposed at the upstream side of the recording electrodes 6 is equal to the length L2 of each of the controlling electrodes 8 disposed at the downstream side of the recording electrodes 6, the electrostatic recording apparatus K is characterized in that the length L5 of each of the recording electrodes 11 disposed at the upstream side of the recording electrodes 6, measured in the transport direction of the electrostatic recording paper P is made smaller than the length L6 of each of the recording electrodes 12 disposed at the downstream side of the recording electrodes 6, measured in the transport direction of the electrostatic recording paper P. Meanwhile, in the electrostatic recording apparatus K, the width L3 of each of the controlling electrodes 11 and 12, measured at right angles to the transport direction of the electrostatic recording paper P, the clearance L4 between adjoining controlling electrodes 11 and also between adjoining controlling electrodes 12, the distance l1 between the controlling electrodes 11 and the recording electrodes 6 and the distance l2 between the recording electrodes 6 and the controlling electrodes 12 are, respectively, set at the same values as those of the stylus head 5 of the prior art electrostatic recording apparatus.

In the electrostatic recording apparatus K, the length L5 of each of the controlling electrodes 11 is set at about 1 to 2 mm and the length L6 of each of the controlling electrodes 12 is about 3 to 5 times the length L5. In order to prevent the recording density of the electrostatic recording apparatus K from falling due to the decreased length L5 of each of the controlling electrodes 11 as compared with the length L1 of each of the controlling electrodes 7 of the known electrostatic recording apparatus, the length L6 of each of the controlling electrodes 12 should be increased. However, since the length L6 of each of the controlling electrodes 12 is restricted to 6 mm approximately at the maximum by the size of the stylus head 10, the voltage applied to the controlling electrodes 11 and 12 should be increased in the case where the recording density is required to be further raised.

Electrostatic recording of the electrostatic recording apparatus K is performed in the exactly same manner as the known electrostatic recording apparatuses. Namely, when the electrostatic recording paper P is disposed between the stylus head 10 and the elastic roller 4, the negative voltage of $-VH$ is applied to the recording electrodes 6 while the controlling electrodes 11 and 12 are equally divided into blocks each containing a proper number of the controlling electrodes 11 and 12 so as to be scanned sequentially one block by one block such that the positive voltage of $+VH$ is applied to each block of the controlling electrodes 11 and 12. Thus, negative electric charge enabling adherence of toner to the electrostatic recording paper P is charged on the recording portions of the electrostatic recording paper P, to which recording portions both the negative voltage of $-VH$ from the recording electrodes 6 and the positive voltage of $+VH$ from the controlling electrodes 11 and 12 are applied.

Although the ghost images are likely to be formed in the case where the controlling electrodes 7 disposed at the upstream side of the recording electrodes 6 in the transport direction of the electrostatic recording paper P have width L1 as large as 4 to 6 mm in the known electrostatic recording apparatuses, the length L5 of each of the controlling electrodes 11 disposed at the upstream side of the recording electrodes 6 is decreased to 1 to 2 mm in the electrostatic recording apparatus K of the present invention. Accordingly, it is supposed that, since the amount of negative electric charge accumulated on the electrostatic recording paper P is decreased, the ghost images are not likely to be formed in the electrostatic recording apparatus K.

In the electrostatic recording apparatus K, it is also possible to convert the polarity of the voltage applied to the recording electrodes 6 and the polarity of the voltage applied to the controlling electrodes 11 and 12 to the polarities opposite to those shown in FIG. 6.

Comparative results between the electrostatic recording of the electrostatic recording apparatus K and that of a known electrostatic recording apparatus will be described by employing a stylus head shown in FIG. 8, hereinbelow.

Figure 8:
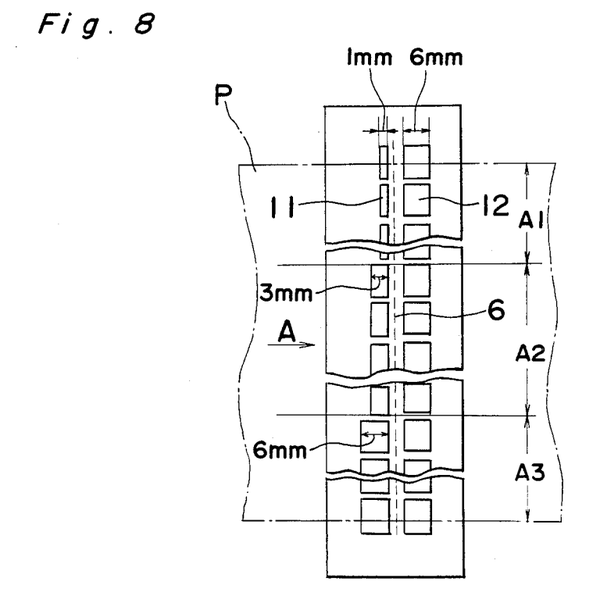
FIG. 8 is a bottom plan view of stylus heads, particularly showing stylus heads of the electrostatic recording apparatus of the present invention in comparison with that of the conventional electrostatic recording apparatus.

The stylus head of FIG. 8 includes three regions A1, A2 and A3 and the length of each of the controlling electrodes 12 disposed at the downstream side of the recording electrodes 6, measured in the transport direction of the electrostatic recording paper P, is set at 6 mm in each of the regions A1, A2 and A3. Meanwhile, the lengths of the controlling electrodes 11 disposed at the upstream side of the recording electrodes 6, measured in the transport direction of the electrostatic recording paper P are set at 1 mm, 3 mm and 6 mm in the regions A1, A2 and A3, respectively. It will be understood that the regions A1 and A2 represent the electrostatic recording apparatus K of the present invention and the region A3 represents the prior art electrostatic recording apparatus. When a voltage of $-320$ V was applied to the recording electrodes 6, and a voltage of $+330$ V was applied to the controlling electrodes 11 and 12 for 20 sec. by using this stylus head so as to perform the electrostatic recording, the recording density substantially exceeded 1.0 (original density) in the region A3 but a number of image defects such as the ghost images, etc. were found in the region A3, thus resulting in low extensive estimation of the images formed in the region A3. On the other hand, no image defect was found in the regions A1 and A2. However, it was found that a recording density in the region A1 is lower than that in the region A3.

Subsequently, when only the voltage applied to the controlling electrodes 11 and 12 of the stylus head was increased to $+380$ V, it was found that the recording density in the region A1 became equal to that at the region A3. Although the region A3 developed image defects in this case, no image defect was found in the regions A1 and A2.

As is clear from the foregoing, images of excellent quality with scant image defects can be obtained by the arrangement in which the width of the face of each of the controlling electrodes disposed at the upstream side of the recording electrodes, measured in the transport direction of the electrostatic recording paper, is made smaller at the face confronting the electrostatic recording paper. Furthermore, it was found that drop in the recording density due to decrease of the width of the face of the controlling electrodes disposed at the upstream side of the recording electrodes can be compensated for by increasing the voltage applied to the controlling electrodes disposed at the upstream side and the downstream side of the recording electrodes.

Figure 9:
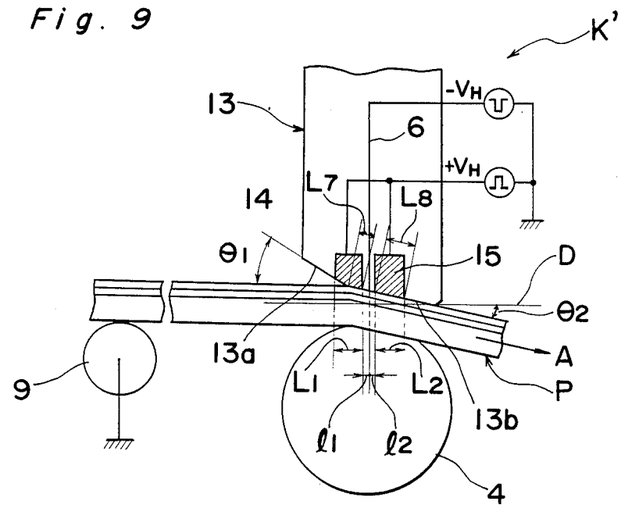
FIG. 9 is a view similar to FIG. 6, particularly showing a modification thereof.

Referring now to FIG. 9, there is shown a modified electrostatic recording apparatus K' of the present invention including a stylus head 13. The stylus head 13 includes the recording electrodes 6, and controlling electrodes 14 and 15 disposed at the upstream side and the downstream side of the recording electrodes 6 in the transport direction of the electrostatic recording paper P, respectively. The stylus head 13 has a first bottom face portion 13a and a second bottom face portion 13b formed at the upstream side and the downstream side in the transport direction of the electrostatic recording paper P. The first bottom face portion 13a extends downwardly in the transport direction of the electrostatic recording paper P so as to form an angle $\theta 1$ with respect to the horizontal line D in FIG. 9 such that a space is defined by the first bottom face portion 13a and the electrostatic recording paper P. The second bottom face portion 13b also extends downwardly in the transport direction of the electrostatic recording paper P so as to form an angle $\theta 2$ with respect to the horizontal line D such that the first bottom face portion 13a and the second bottom face portion 13b intersect with each other at the bottom face of each of the controlling electrodes 15 with the angle $\theta 1$ being larger than the angle $\theta 2$. When the stylus head 13 is caused to confront the elastic roller 3 with the electrostatic recording paper P interposed between the stylus head 13 and the elastic roller 4, the length L7 of the face of each of the controlling electrodes 14 disposed at the upstream side of the recording electrodes 6 in the transport direction of the electrostatic recording paper P, measured in the transport direction of the electrostatic recording paper P, becomes smaller than the length L1 of the known electrostatic recording apparatus with the face of each of the controlling electrodes 14 confronting the electrostatic recording paper P while the length L8 of the face of each of the controlling electrodes 15 disposed at the downstream side of the recording electrodes 6 in the transport direction of the electrostatic recording paper P, measured in the transport direction of the electrostatic recording paper P, becomes larger than the length L2 of the known electrostatic recording apparatus at the face of each of the controlling electrodes 15 confronting the electrostatic recording paper P. Namely, the length L7 of each of the controlling electrodes 14 disposed at the upstream side of the recording electrodes 6 becomes smaller than the length L8 of each of the controlling electrodes 15 disposed at the downstream side of the recording electrodes 6.

The modified electrostatic recording apparatus K' has the same effects on elimination of image defects as the electrostatic recording apparatus K according to the first embodiment of the present invention. Furthermore, in the modified electrostatic recording apparatus K', since the stylus head 13 has the space defined at an angle ($\theta 1 + \theta 2$) with respect to the electrostatic recording paper P, it becomes possible to pass the electrostatic recording paper P between the stylus head 13 and the elastic roller 4 remarkably efficiently. Moreover, the modified electrostatic recording apparatus K' can be also obtained simply by machining the conventional stylus head in which the length of each of the controlling electrodes disposed at the upstream side of the recording electrodes, measured in the transport direction of the electrostatic recording paper, is equal to that of each of the controlling electrodes disposed at the downstream side of the recording electrodes.

Figure 10:
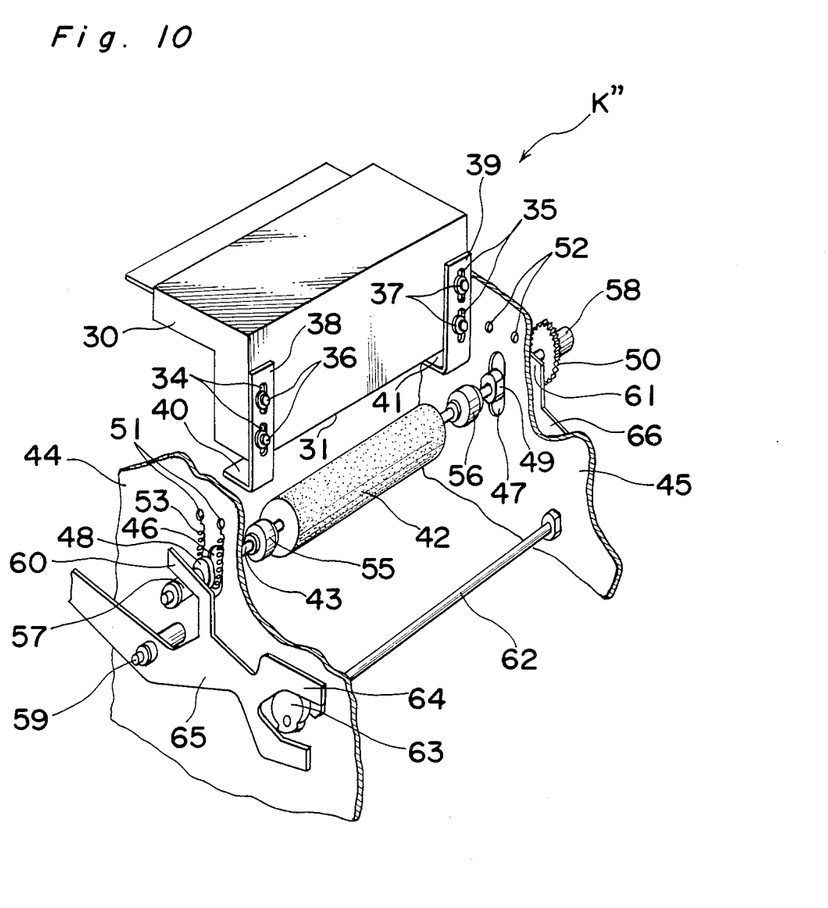
FIG. 10 is a perspective view of an electrostatic recording apparatus according to a second embodiment of the present invention.
Figure 11:
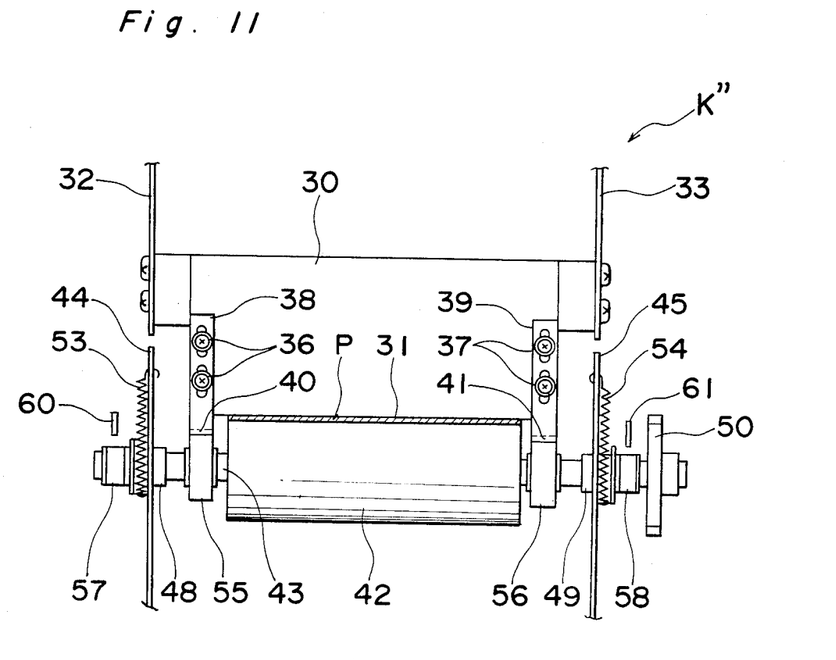
FIG. 11 is a transverse sectional view of the electrostatic recording apparatus of FIG. 10.

Referring now to FIGS. 10 and 11, there is shown an electrostatic recording apparatus K'' according to a second embodiment of the present invention. The electrostatic recording apparatus K'' includes a stylus head 30, a pair of side plates 32 and 33, a pair of positioning levers 38 and 39, an elastic roller 42, a rotary shaft 43, a pair of side plates 44 and 45, a pair of bearings 48 and 49, a gear 50, a pair of tension springs 53 and 54, a pair of positioning bearings 55 and 56, a pair of rollers 57 and 58, a pair of shafts, only shaft 59 being visible, a rod 62, a pair of eccentric cams, only cam 63 being visible, and a pair of retraction levers 65 and 66. The stylus head 30 of a substantially L-shaped configuration is fixedly provided between the side plates 32 and 33 such that a discharge face 31 of the stylus head 30 confronts the elastic roller 42. The positioning levers 38 and 39 of a substantially L-shaped configuration have bent portions 40 and 41, respectively. The positioning lever 38 has a plurality of elongated through-openings 34 formed at one portion thereof other than the bent portion 40. Likewise, the positioning lever 39 has a plurality of elongated through-openings 35 formed at one portion thereof other than the bent portion 41. The positioning levers 38 and 39 are secured to the stylus head 30 by machine screws 36 inserted into the elongated through-openings 34 and machine screws 37 inserted into the elongated through-openings 35, respectively so as to be disposed adjacent to one side and the other side of the stylus head 30 such that the bent portions 40 and 41 extend in parallel with the discharge face 31. The side plate 44 is disposed adjacent to the side plate 32 and is formed with an elongated through-hole 46 while the side plate 45 is disposed adjacent to the side plate 33 and is formed with an elongated through-hole 47 such that the elongated through-holes 46 and 47 confront each other. The bearings 48 and 49 are, respectively, fitted into the elongated through-holes 46 and 47 so as to support the rotary shaft 43 extending through the elastic roller 42. The elastic roller 42 is adapted to be rotated by the gear 50 mounted on the rotary shaft 43 with the gear 50 being disposed outwardly of the side plate 45. Furthermore, the side plate 44 has two holes 51 formed above the elongated through-hole 46 such that opposite ends of the tension spring 53 wound around the bearing 48 are attached to the holes 51. Likewise, the side plate 45 has two holes 52 formed above the elongated through-hole 47 such that opposite ends of the tension spring 54 wound around the bearing 49 are attached to the holes 52. Thus, the elastic roller 42 is urged upwardly by the tension springs 53 and 54 so as to be brought into pressure contact with the discharge face 31 of the stylus head 30. The positioning bearings 55 and 56 are rotatably mounted on the rotary shaft 43 so as to confront the bent portions 40 and 41, respectively such that the positioning bearings 55 and 56 are, respectively, brought into contact with the bent portions 40 and 41 by an urging force of the tension springs 53 and 54. Namely, when the elastic roller 42 is brought into pressure contact with the discharge face 31 of the stylus head 30 by the tension springs 53 and 54 as shown in FIG. 11, the bent portion 40 of the positioning lever 38 and the bent portion 41 of the positioning lever 39 are brought into contact with the positioning bearings 55 and 56, respectively, whereby the elastic roller 42 is brought into pressure contact with the discharge face 31 uniformly. It is desirable that the elastic roller 42 be arranged to be spaced away from the discharge face 31 except during the electrostatic recording, because the surface of the elastic roller 42 is likely to be deformed where the elastic roller 42 is held in pressure contact with the discharge face 31 at all times. Accordingly, in the electrostatic recording apparatus K", there are provided the retraction levers 65 and 66 adapted to be operatively associated with the rollers 57 and 58 which are rotatably mounted on opposite ends of the rotary shaft 43 so as to be disposed outwardly of the side plates 44 and 45, respectively. The rod 62 is secured to the side plates 44 and 45 so as to extend therethrough such that the eccentric cams are rotatably mounted on opposite ends of the rod 62, respectively. The retraction lever 65 is pivotally supported by the shaft 59 mounted on the side plate 44 and has a first lever portion 60 and a second lever portion 64 which are arranged to be brought into contact with the roller 57 and the eccentric cam 63, respectively. Likewise, the retraction lever 66 is pivotally supported by the shaft (not shown) and has a first lever portion 61 and a second lever portion (not shown) which are arranged to be brought into contact with the roller 58 and the eccentric (not shown), respectively.

In the state shown in FIG. 10, since the eccentric cams 63 and 63' are, respectively, in contact with the second lever portions 64 and 64', the rollers 57 and 58 are depressed downwardly by the first lever portions 60 and 61 against the urging force of the tension springs 53 and 54, respectively and thus, the elastic roller 42 is spaced away from the discharge face 31.

In order to start the electrostatic recording in the electrostatic recording apparatus K", a driving motor (not shown) is started, so that the elastic roller 42 is rotated through the gear 50 and, at the same time, the eccentric cams are rotated upon actuation of a half-rotating clutch (not shown). Thus, the retraction levers 65 and 66 are rotated in the clockwise direction in FIG. 10, so that the first lever portions 60 and 61 are brought out of contact with the roller 57 and 58 mounted on the rotary shaft 43, respectively and thus, the elastic roller 42 is brought into pressure contact with the discharge face 31 of the stylus head 30. At this moment, the positioning bearings 55 and 56 rotatably provided coaxially with the elastic roller 42 are, respectively, brought into contact with the bent portion 40 of the positioning lever 38 and the bent portion 41 of the positioning lever 39, whereby the elastic roller 42 is accurately positioned with respect to the discharge face 31. Namely, since the positioning bearings 55 and 56 rotatably mounted on the rotary shaft 43 are brought into contact with the positioning levers 38 and 39, respectively, the elastic roller 42 is maintained at a predetermined position with respect to the discharge face 31 at all times so that the electrostatic recording paper P is transported with respect to the discharge face 31 under a constant contact force and thus, sharp electrostatic recording can be performed at all times.

That is, since the tension springs 53 and 54 have such a strength that the electrostatic recording is not affected by the mechanical vibration, variations in hardness and reactive force of the elastic roller 42, variations in backlash in engagement of the gear 50, etc., such disadvantages that the image has an unformed part, ghost images are formed, the background of the image is stained, etc. are eliminated.

When the electrostatic latent images have been formed on the electrostatic recording paper P, the electrostatic recording paper P is ejected out of the electrostatic recording apparatus K" after development and fixing of the electrostatic latent images while the eccentric cams are rotated such that the elastic roller 42 is spaced away from the discharge face 31.

As can be understood from the foregoing description, in accordance with the present invention, since the width of the face of each of the controlling electrodes disposed at the upstream side in the transport direction of the electrostatic recording paper, measured in the transport direction of the electrostatic recording paper is formed smaller than that of each of the controlling electrodes disposed at the downstream side in the transport direction of the electrostatic recording paper at the face confronting the electrostatic recording paper, images of excellent quality with scant image defects such as the ghost images unnecessary for the recording images and scratches having a size far smaller than the diameter of one dot as the smallest recording unit can be obtained by the simple arrangement. Furthermore, since the stylus head can be manufactured substantially by conventional manufacturing processes, the electrostatic recording apparatus does not have a high production cost. Meanwhile, since the control circuit is the same as that of the known electrostatic recording apparatuses, images of excellent quality can be obtained also simply by replacing the stylus head of the prior art electrostatic recording apparatus with the stylus head of the present invention.

Furthermore, in accordance with the present invention, since the elastic roller can be maintained at a predetermined position with respect to the discharge face of the stylus head at all times, images of excellent quality without such defects that the image has an unformed portion, ghost images are formed, fogging is produed at the background of the image, etc. can be obtained. Moreover, since the electrostatic recording paper is transported with respect to the discharge face under a constant contact force, sharp electrostatic recording can be performed at all times.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In an electrostatic recording apparatus including a recording head comprising a plurality of recording electrodes arranged at right angles to a transport direction of an electrostatic recording paper, a plurality of first controlling electrodes disposed in parallel with said recording electrodes and at the upstream side of said recording electrodes with respect to the transport direction of the electrostatic recording paper, and a plurality of second controlling electrodes disposed in parallel with said recording electrodes and at the downstream side of said recording electrodes with respect to the transport direction of the electrostatic recording paper such that an electrostatic image is formed on the electrostatic recording paper at the recording position of said recording head, said first controlling electrodes each having a first face confronting the electrostatic recording paper, with said first face having a first width in the transport direction of the electrostatic recording paper,
said second controlling electrodes each having a second face confronting the electrostatic recording paper, with said second face having a second width in the transport direction of the electrostatic recording paper, and
said first width of said first face being smaller than said second width of said second face.

2. An electrostatic recording apparatus as claimed in claim 1, wherein said recording head has a first bottom face portion and a second bottom face portion formed on the bottom face thereof with said first bottom face portion and said second bottom face portion disposed at the upstream side and at the downstream side with respect to the transport direction of the electrostatic recording paper, respectively,
said first bottom face portion and said second bottom face portion being, respectively, inclined with respect to the electrostatic recording paper,
said first bottom face portion having one end which intersects with said second bottom face portion, said one end being disposed at a bottom face of each of said first controlling electrodes with said first bottom face portion extending from said one end in a direction remote from the electrostatic recording paper with respect to a direction opposite to the transport direction of the electrostatic recording paper,
said second bottom face portion extending from said one end of said first bottom face portion in a direction toward the electrostatic recording paper with respect to the transport direction of the electrostatic recording paper.

3. An electrostatic recording apparatus as claimed in claim 2, wherein the angle defined by said first bottom face portion and the electrostatic recording paper in the direction opposite to the transport direction of the electrostatic recording paper is larger than the angle defined by said second bottom face portion and the electrostatic recording paper in the transport direction of the electrostatic recording paper.

4. In an electrostatic recording apparatus which comprises a plurality of electrodes arranged at right angles to a transport direction of an electrostatic recording paper, a plurality of first and second controlling electrodes disposed parallel to and having said recording interposed therebetween, said first controlling electrodes being disposed at the upstream side of said recording electrodes and having a width facing the recording paper smaller than the width of said second controlling electrodes disposed at the downstream side of said recording electrodes.

5. An electrostatic recording apparatus as claimed in claim 4, wherein the width of each of said first controlling electrodes is about 1 to 2 mm and the width of each of said second controlling electrodes is about 3 to 5 times thereof.

* * * * *